(12) United States Patent
Guidetti

(10) Patent No.: US 6,820,732 B2
(45) Date of Patent: Nov. 23, 2004

(54) OUTPUT ASSEMBLY FOR STORAGE DEVICES, FOR INSTANCE FOR AUTOMATIC PACKAGING INSTALLATIONS

(75) Inventor: Dario Guidetti, Novara (IT)

(73) Assignee: Cavanna S.p.A., Novara (IT)

( * ) Notice: Subject to any disclaimer, the term of this patent is extended or adjusted under 35 U.S.C. 154(b) by 0 days.

(21) Appl. No.: 10/461,150

(22) Filed: Jun. 12, 2003

(65) Prior Publication Data

US 2004/0052619 A1 Mar. 18, 2004

(30) Foreign Application Priority Data

Sep. 16, 2002 (EP) .............................................. 02425561

(51) Int. Cl.$^7$ ................................................. B65G 1/00
(52) U.S. Cl. .................................. 198/347.1; 198/347.3
(58) Field of Search ........................... 198/347.1, 347.2, 198/347.3; 414/277, 280, 281, 285, 331

(56) References Cited

U.S. PATENT DOCUMENTS

| | | | | |
|---|---|---|---|---|
| 5,362,197 A | * | 11/1994 | Rigling ....................... | 414/273 |
| 5,366,063 A | * | 11/1994 | Pollock .................... | 198/347.3 |
| 5,415,280 A | * | 5/1995 | Balboni et al. .......... | 198/347.3 |
| 5,529,165 A | * | 6/1996 | Shupert .................... | 198/347.3 |
| 5,543,699 A | * | 8/1996 | Schoeneck ............... | 198/347.1 |
| 5,906,484 A | * | 5/1999 | Imai ......................... | 198/347.1 |

FOREIGN PATENT DOCUMENTS

| | | |
|---|---|---|
| EP | 0534902 | 3/1993 |
| EP | 0565098 | 10/1993 |
| FR | 2176324 | 10/1973 |
| FR | 2424705 | 11/1979 |
| FR | 2521110 | 8/1983 |
| GB | 2217170 | 10/1989 |
| GB | 2336824 | 11/1999 |
| IT | 1195128 | 10/1998 |

* cited by examiner

Primary Examiner—James R. Bidwell
(74) Attorney, Agent, or Firm—Dorsey & Whitney LLP

(57) ABSTRACT

An output assembly for stores for picking up stored products from an output section of a store, where a plurality of shelves is present for storing products, the aforesaid shelves being set on top of one another and being able to move in a vertical direction. The assembly comprises a moving element for picking up the products, which can move in a substantially vertical direction so as to reach selectively the height of one of the shelves of said plurality. The moving element comprises an unloading unit for determining selectively unloading of the products that are found on the shelves and at least one structure for receiving the products unloaded from said shelves. Also provided is at least one conveying structure for transferring the products unloaded from said store by the moving element. The conveying structure comprises a first portion, which is associated to the moving element and can move together with the latter, a second portion, which is substantially stationary with respect to the moving element, and a third portion, which is set between the first portion and the second portion and is able to perform a general movement of swinging so as to be able to follow the first portion which moves with the moving element and to transfer onto the second portion the products picked up from the store in conditions of substantial continuity of the conveying surface.

7 Claims, 1 Drawing Sheet

Figure 1:
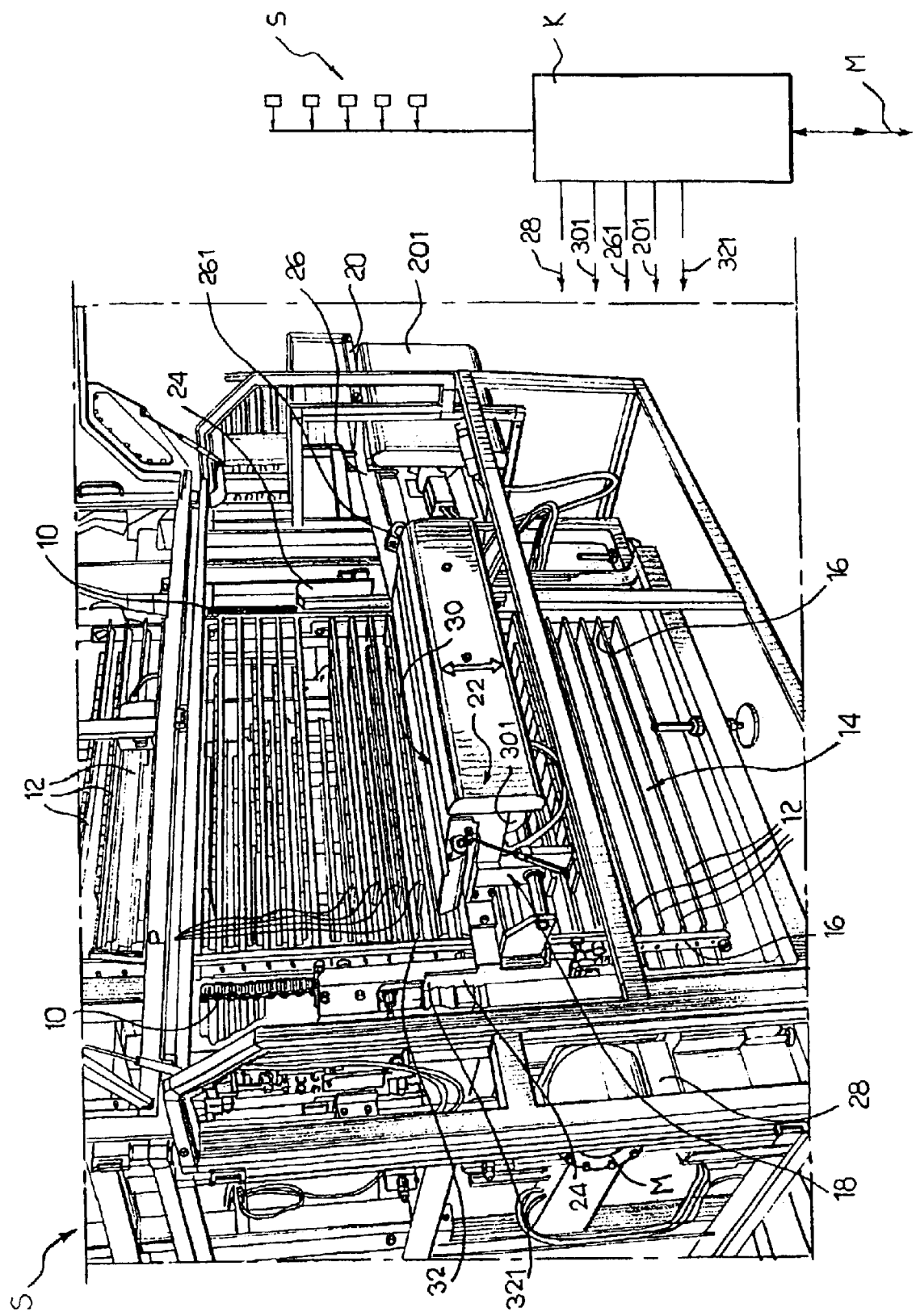

OUTPUT ASSEMBLY FOR STORAGE DEVICES, FOR INSTANCE FOR AUTOMATIC PACKAGING INSTALLATIONS

CROSS REFERENCE TO RELATED APPLICATION

This application claims priority to European Patent Office Application Number 02425561.4, filed Sep. 16, 2002, which is incorporated herein by reference in its entirety.

DETAILED DESCRIPTION OF THE INVENTION

The present invention relates in general to storage devices comprising a plurality of mobile shelves, with an output area where a plurality of such shelves are substantially set on top of one another and are able to move vertically.

Stores of this type are widely known in the prior art, as is documented, for example, by EP-A-0 565 098, FR-A-2 176 324, FR-A-2 521 110, FR-A-2 424 705, GB-A-2 217 170, GB-A-2 336 824, and EP-A-0 534 902.

Some of the above documents approach the problem of loading the products in one such store by means of an input conveyor, on which the products to be stored advance arranged in ranks of products aligned at least approximately in a direction transverse to the direction of advance of the products themselves. Each rank is hence to be loaded on a respective shelf of the store. During loading of the products it is in fact necessary to meet certain essential requirements, such as, for example, the need to ensure that, at the moment in which each rank of products is transferred from the supply conveyor to the store, a free shelf is present and available in the store to receive the rank of products that is loaded. This must be done, ensuring that transfer of the ranks of products is as regular as possible.

In some stores the shelves are arranged in groups, each group being comprised in a so-called "gondola" suspended with a general hunting capability to a motor-driven chain conveying structure. In this case, it is important to ensure that no undesired phenomena of oscillation of the gondolas are set up in the store that might cause the products in the store to fall.

In particular, in the context considered above, it has already been proposed to use mechanisms for following the shelves of the store by means of an oscillating structure of the type described in the document IT-B-1 195 128, in the name of the present applicant.

Usually, the solutions according to the prior art to which reference is made previously do not ascribe particular importance to the criteria with which the operation of unloading of the ranks of products from the shelves of the store is carried out. The unloading operation is usually considered less critical than the loading operation.

Practice shows, however, that such known solutions are not able to provide an adequate answer to the various requirements.

In the first place, at least in given conditions of use, picking-up of the products from the store must be carried out at very high rates, and hence in conditions which (above all when dangerous phenomena of oscillation of the gondolas, in which the shelves are organized, are to be avoided) are scarcely compatible with the arrest of the individual shelves at an unloading station.

In the second place, the fact that, downstream of the store, the products are organized in ranks can prove disadvantageous for subsequent handling operations. For example, if the products picked up from the store are articles such as confectionery articles, which are to be subsequently packaged in individual wrappers of the type currently referred to as "flow-packs", it is necessary for the products to be able to be sent onto the corresponding wrapping machine no longer arranged in ranks but in an orderly flow of products set sequentially.

There thus exists the need to have available output assemblies for stores of the type described above, which will be able to meet in an altogether complete way the various requirements mentioned above.

The purpose of the present invention is to provide an output or unloading assembly of this sort.

According to the present invention, the above purpose is achieved thanks to an output assembly for stores having the characteristics recalled specifically in the claims that follow.

The invention will now be described, purely by way of non-limiting example, with reference to the annexed drawings consisting of a single FIGURE, which reproduces a general perspective view of an output assembly for stores built according to the invention.

In the annexed drawing, the reference S designates, as a whole, a so-called store (or storage unit) which can be used for temporary storage of products, for example in the context of a packaging plant.

In a typical example of application, the store may be a store designed to be used in the context of a plant for automatic packaging of confectionery products, such as, for instance, bars of chocolate or similar products.

The view of the annexed drawing illustrates, in particular, the output section of the store S. At said output section the conveying structure of the store S, which usually consists of a motor-driven chain conveyor, comprises two branches of chain 10 which extend vertically. The chains 10 support, in a general vertical plane, a plurality of shelves 12, on which respective articles P are to be present (in the set of shelves 12 located in the top part of the drawing), arranged in ranks and consisting, for example, of confectionery products of the type referred to previously.

In a preferred way, the shelves 12 are grouped together into structures 14, currently referred to as "gondolas". Each gondola usually comprises a certain number of shelves 12 (for example five shelves) kept on top of one another and fixed together by two vertical uprights 16.

At the two sides of each gondola 14 the two uprights 16 are connected at their top ends to one of the chains 10 according to a general structure which enables free hunting, the aim being to allow the shelves 12 to maintain a general horizontal orientation also when the respective drawing chains 10 follow non-vertical paths.

The conveying system in which said chains are comprised usually presents, in fact, a general loop development, in such a way as to enable the shelves 12 to follow a path comprising:

an active stretch which extends from the loading section towards the unloading section of the store S with a usually quite tortuous path comprising a plurality of bends in the top part of the store S; and a passive stretch or return stretch, which extends from the output or unloading end to the input end, which usually also follows a tortuous path in the lower part of the store.

The above description corresponds to well-known constructional criteria. The said criteria can be derived also from several of the various examples of prior art cited in the introductory part of the present description and, consequently, do not call for a detailed description herein.

Described specifically herein is an assembly 18, the function of which is to enable orderly picking-up of the ranks of products P which are located on the shelves 12, with a view to enabling their transfer at output to a conveyor 20, which feeds the products on to other handling stations situated downstream (not illustrated but of a known type).

With reference to the observation point of the figure and of the attached drawings, the products P are picked up from the store S and fed forwards in the direction of the observer and then, once they have been taken out of the store S, are fed from left to right until they reach the conveyor 20.

In addition to the output conveyor 20 referred to previously, the assembly 18 comprises a moving element 22 mounted on vertical guides 24 fixed to the framework of the store S. The moving element is thus able to perform a general movement of raising and lowering in a vertical direction with respect to the store S itself.

The assembly 18 further comprises a linking conveyor, which extends to form a connection between the moving element 22 and the conveyor 20, with the capacity of performing a general movement of swinging in a vertical direction.

It will, in fact, be appreciated that the end of the linking conveyor 26, located on the left in the figure, is connected to the moving element 22 and is hence able to follow the moving element 22 in its general movement of raising and lowering on the guides 24. The end of the said conveyor 26 located on the right is, instead, connected to the conveyor 20, which is supported, at a fixed height, on the frame of the store S.

Viewed in plan view, the moving element 22 comprises essentially a rectangular framework which surrounds the ensemble formed by the two chains 10 and the gondolas 14 with the shelves 12 in such a way that it can be freely displaced upwards and downwards with respect to the gondolas in question, moving along the guides 24.

The above movement is usually controlled by a motor assembly designated by 28.

The two main branches of the aforesaid framework then come to occupy positions, one on the inside and one on the outside of the shelves 12.

Of course, the terms "inside" and "outside" refer to the store S as a whole. In other words, the branch of the framework that can be seen in the foreground of the annexed drawings is the branch located outside.

Mounted on the aforesaid external branch is a further conveyor 30 usually made up, as are the output conveyor 20 and the linking conveyor 26, of a motor-driven belt conveyor of a known type. Of course, the solution according to the invention is suitable for being implemented also with conveyors of another kind.

The conveyors in question, which define, respectively, a first portion (the conveyor 30), a second portion (the conveyor 20), and a third portion (the conveyor 26) forming a single conveying structure, are driven by respective motor assemblies 301, 201, 261, which are also of a known type.

On the internal branch of the framework of the moving element 22 there is, instead, mounted an ejector assembly 32 of the type consisting of a blade set vertically, subjected to the action of one or more jacks 321. Activation of the jack or jacks in question brings the blade 32, which is normally kept in a position set alongside and hence not interfering with the movement of vertical translation of the shelves 12 to perform a general movement of advance towards and through a shelf 12, which is currently at the same height as the blade 32.

In this way, expulsion of the products P situated on the shelf in question is brought about towards the outer part of the moving element 22, i.e., on the transporting branch of the conveyor 30.

Operation of the assembly described above is governed by a control unit K consisting, for instance, of a programmable-logic controller (PLC) or an equivalent processing unit.

The control unit K is designed to regulate, in a coordinated way, movement of the motor 28, which moves the moving element 22 on the guides 24, and of the motors 301, 261 and 201 of the conveyors 30, 26 and 20, respectively, as well as of the actuator 321, which moves the ejection blade 32. The processing unit K operates according to signals issued by a plurality of sensors, which are collectively designated by which are located in various areas of the device so as to detect the position of the various parts making it up, as well as the position of the products P.

The processing unit K can also control (or, at any rate, be sensitive to) operation of the motor M which in general controls movement of the store M.

The programming configuration of the unit K (also as regards the choice of the motor-power drives, which are controlled or are designed to function as master power drives, in regard to which the other power drives are slaves) are actuated according to different criteria depending upon the specific applicational requirements. This applies also as regards the choice of the type, number and location of the sensors S.

The above activity of configuration and programming may be conveniently carried out by a person skilled in programming of the operation of machines of the type described, according to the description provided in what follows of a possible operating cycle of the device described.

It is, in any case, emphasized that the example provided in what follows in just one possible example of operation of the device described herein.

In particular, it is possible to suppose that operation of the device is under conditions in which, at least for a certain interval of time, the intention is to supply, on the conveyor 20, a continuous flow of products P picked up from the shelves 12 of the store S. In what has been said, it is understood that the products P are picked up from the shelves 12 whilst they are moving gradually, with a substantially regular and continuous movement from the top downwards so as to bring the products P gradually into a position corresponding to the moving element 22, which sees to taking them out of the store.

To enable extraction of the individual rank of products P from the respective shelf 12, it is envisaged that the moving element 22 can "follow" the shelf by moving along the guides 24 so as to cause, during the transfer operation, both the ejection blade 32 and the conveyor 30 that is designed to receive the products to be and to remain at the same height as the shelf 20 in conditions of virtually zero relative vertical movement.

In the above conditions, the actuator 321 can be activated so as to move the ejection blade 32 and transfer a respective rank of products onto the conveyor 32.

Immediately afterwards, the blade 32 can be recalled into its resting position by the actuator 321 so as to disengage it with respect to the vertical array of the shelves 12. In these conditions, the moving element 22 is able to move vertically (in principle, both in the raising direction and in the lowering direction) so as to follow another shelf 12 and prepare itself for extraction of another rank of products once said further shelf has been reached.

The above is achieved whilst the rank of products picked up previously is transferred by the conveyor 30 (which is normally kept stationary in the time interval during which expulsion of the rank of products is carried out) transfers the rank of products that have just been picked up towards the conveyor 20 via the linking conveyor 26.

It will be appreciated, in fact, that, thanks to the capacity of the conveyor 26 to perform a general movement of swinging in a vertical direction, the conveyors 20 and 30 are found to be operating in a relationship of substantial continuity of the conveying surfaces, without any jumps or appreciable differences in level.

The above is achieved also exploiting the fact that the shelves 12 have a generically elongated shape, whilst the extraction structure 32 operates in a transverse direction with respect to the main direction of extension of the shelves themselves, and the first part of the conveying structure consisting of the conveyor 30 extends in a position that is substantially set alongside the shelves so as to move the products in a direction parallel to the main direction of extension of the shelves 12.

As soon as the rank of products previously loaded has been unloaded onto the conveyors 26 and 20, the conveyor 30 is immediately available to receive a new rank of products unloaded from another shelf 12 of the store S.

In this connection, it will be appreciated that, by intervening (according to criteria in themselves known) on the power drives 301, 261, 201, which are partially independent of one another, and hence on the speeds of movement of the conveyors 30, 26 and 20, it is possible to modify the relative distances that separate the products within each rank. The aim is to cause the products P, even though they are picked up in the store S according to successive ranks (i.e., according to a "parallel" format), will be rendered available at output from the conveyor 20 in the form of a "sequential" flow of products which is substantially continuous and uniform. A sequential format of this sort is usually largely preferred for the subsequent operations of handling, such as, for instance, packaging or wrapping of a "flow-pack" type.

It will moreover be appreciated that the modalities of unloading described above also involve a virtual rotation through 90° of the products P with respect to their original directions of feed.

In fact, the products P, which are loaded onto and unloaded from the store S "lengthwise", i.e., as a result of a movement in the direction of their major direction, finally advance along the conveyor 20 set "sideways on", i.e., with their direction of major extension oriented in a direction transverse and orthogonal to the direction of feed.

By intervening (in a way in itself known) on the modalities of operation of the device by means of the processing unit K, it is also possible to obtain accessory functions, such as temporary accumulation of the products P, organization of the products P at output in groups of products, each of which comprising a number of products different from the number contained in the individual rank, etc.

It is, therefore, evident that, without prejudice to the principles of the invention, the details of implementation and embodiments may vary widely with respect to what is described and illustrated herein, without thereby departing from the scope of the invention, as this is defined by the ensuing claims.

What is claimed is:

1. An output assembly for stores for picking up stored products from an output section of a store, where a plurality of shelves is present for storing products, said shelves being set substantially on top of one another and being able to move in a vertical direction, the assembly comprising:
    a moving element for picking up the products, which can move in a substantially vertical direction so as to reach selectively the height of one of the shelves of said plurality, said moving element comprising an unloading unit for determining selectively unloading of the products that are found on said shelves and at least one structure for receiving said products unloaded from said shelves;
    at least one conveying structure for transferring, starting from said moving element, said products unloaded from said shelves, said conveying structure comprising:
        a first portion, which is associated to said moving element and can move together with the latter;
        a second portion, which is substantially stationary with respect to said moving element; and
        a third portion, which is set between said first portion and said second portion, said third portion being able to perform a general movement of swinging so as to be able to follow said first portion which moves with said moving element and to transfer onto said second portion the products picked up from said moving element in conditions of substantial continuity of the conveying surface.

2. The assembly of claim 1, wherein said first portion of said conveying structure defines a surface for receiving the products unloaded from said shelves by said unloading unit.

3. The assembly of claim 1, wherein said unloading unit comprises an elongated formation which is able to move in a transverse direction with respect to said shelves so as to produce expulsion of the products which are on said shelves.

4. The assembly of claim 1, wherein said moving element comprises an internal branch and an external branch with respect to said shelves, which are substantially set on top of one another, and in that said unloading unit and said receiving structure are located, respectively, on said internal branch and on said external branch of said moving element.

5. The assembly of claim 1, wherein said shelves have a generically elongated shape and in that said unloading unit operates in a transverse direction with respect to the main direction of extension of said shelves, whilst said first part of said conveying structure extends in a position set substantially alongside said shelves and is able to move said products parallel to said main direction of extension of the shelves.

6. The assembly of claim 1, wherein said first portion, said second portion, and said third portion of said conveying structure are provided with respective motor-powered drives which can at least partially be controlled independently of one another, so as to modify selectively the relative position of the products travelling on said conveying structure.

7. The assembly of claim 1, having associated to said moving element a respective motor-powered drive for controlling movement of said moving element for following said shelves.

* * * * *